United States Patent [19]

Humblet et al.

[11] 4,039,468
[45] Aug. 2, 1977

[54] PROCESS FOR THE TREATMENT OF ORGANIC WASTES

[75] Inventors: Lucien A. Humblet, Mol; Louis Salomon, Balen; Hubert R. Eschrich, Geel, all of Belgium

[73] Assignee: Societe Europeenne pour le Traitement Chimique des Combustibles Irradies (Eurochemic), Mol, Belgium

[21] Appl. No.: 612,987

[22] Filed: Sept. 12, 1975

[30] Foreign Application Priority Data

Sept. 12, 1974 Belgium .................................. 148437

[51] Int. Cl.² ............................................. G21F 9/06
[52] U.S. Cl. ............................................. 252/301.1 W
[58] Field of Search ................. 252/301.1 W, 301.1 R; 423/10; 210/21

[56] References Cited

U.S. PATENT DOCUMENTS

| 3,666,673 | 5/1972 | Knoll | 252/301.1 W |
| 3,764,553 | 10/1973 | Kirby | 252/301.1 W |

Primary Examiner—Benjamin R. Padgett
Assistant Examiner—Deborah L. Kyle
Attorney, Agent, or Firm—Sughrue, Rothwell, Mion, Zinn and Macpeak

[57] ABSTRACT

This invention relates to a process for the treatment of organic wastes, resulting from the extraction of metal elements by a solvent of the phosphoric acid ester type in the presence or not of an organic diluent.

These organic wastes result in particular from the extraction of metals in radiochemical separation plants, especially in plants for the reprocessing of irradiated nuclear fuels.

The process according to this invention comprises the following three main steps:

a. separation of the phosphoric acid ester from its organic diluent in such a way that the phosphate phase contains the degradation products and also the elements to be finally insolubilized;

b. de-esterification of the phosphate, i.e. conversion of it into phosphoric acids on one side and organic compounds mainly consisting of hydrocarbons on the other side;

c. solidification of the liquid radioactive phosphoric acids in the form of inorganic phosphates, which can eventually be incorporated into a suitable matrix material.

13 Claims, No Drawings

PROCESS FOR THE TREATMENT OF ORGANIC WASTES

BACKGROUND OF THE INVENTION

It is known that nuclear fuels irradiated in reactors are treated in plants especially constructed and equipped to recuperate the uranium not burned up and the plutonium, formed in the fuel. After the cutting or chemical decladding of the fuel rods, the core materials of the fuel rods are dissolved, generally in nitric acid, and uranium and plutonium are separated from the fission products by a series of extractions with selective organic agents as, in the case of the Purex process, tributyl phosphate (TBP), which is diluted in an organic solvent (aliphatic hydrocarbon of the kerosene type, or aromatic hydrocarbons)

This solvent is recovered at the end of each extraction cycle, decontaminated and used again many times. But finally, the mixture of TBP and kerosene is more and more degraded by the action of radiation and reagents and accumulates organic or organo-metallic degradation products, and its decontamination becomes after each cycle more and more incomplete. It is therefore necessary to renew the solvent and to reject the used solvent as waste.

It is the current practice to store the used solvent for a certain time in order to allow the fission products with a shorter half-life to decay before the used solvent is disposed of by incineration.

This way of working has several drawbacks:

1. The incineration leads to an atmospheric pollution as the phosphorus which is present in the waste is emitted into the atmosphere via a chimney in the form of phosphorus pentoxide which, in contact with the humidity of the air, is converted into phosphoric acid; thus, for instance, the incineration of a solvent of 30% TBP in kerosene at a rate of 20 l/h leads to the dispersion of 50 kg phosphoric acid per day.
2. Even more severe is the fact that radionuclides, present in the solvent (plutonium and uranium included), are also released via the stack into the atmosphere; therefore, it is necessary to apply a pre-treatment to the solvent in order to decontaminate it. Such a decontamination can be effected by a process in which steam at 125°-150° C is injected into the solvent. However, this leads to the undesired formation of a great volume of a low active aqueous waste and to an additional spreading of the activity.
3. The temporary storage of the solvent waste requires a storage capacity which should be avoided for a safe and economic waste management.

OBJECTS OF THE INVENTION

An object of the invention is a process which permits to render insoluble in a small volume the metal elements present in the considered organic wastes.

Another object of the invention is a process which permits the conversion of the used organic solvent in one or several organic fractions of simple structures (e.g. hydrocarbons) having no affinity for the metal elements present in the considered initial organic waste.

DESCRIPTION OF THE INVENTION

The process according to this invention for the treatment of organic wastes resulting from the extraction of metal elements by a solvent of the phosphoric acid ester type in the presence or in the absence of an organic diluent comprises the following main steps:

a. separation of the phosphoric acid ester from its organic diluent in such a way that the ester phase contains the degradation products and also the elements to be finally insolubilized;

b. conversion of the phosphoric acid ester into phosphoric acids on one side and organic compounds mainly consisting of hydrocarbons on the other side;

c. solidification of the liquid radioactive phosphoric acids in the form of inorganic phosphates, which can eventually be incorporated into a suitable matrix material.

According to a feature of the invention, the organic diluent is unpolar and the separation of the phosphate and the organic diluent is made by means of a polar agent which is selectively miscible with the phosphate.

The conversion of the phosphoric acid ester is made by pyrolysis (and partially by hydrolysis and acidolysis).

In a preferred embodiment of the invention, the ester is tributyl phosphate (TBP) and its diluent is kerosene, whereas the polar agent is concentrated phosphoric acid.

Instead of an alkyl phosphate, such as tributyl phosphate or diethylhexyl phosphate, other esters of phosphoric acid may be used, such as aryl phosphates (for example, triphenyl phosphate). It is also possible to use alkylaryl phosphates or mono- or di-alkylphosphates, such as monobutyl phosphate or dibutylphosphate.

In this embodiment, the first step of the process according to the present invention takes place at room temperature and consists of mixing the solvent with concentrated phosphoric acid (preferably with the phosphoric acid formed in the second step of the process) in quantities sufficient to dissolve all the TBP in the phosphoric acid phase. The free kerosene (diluent of the TBP), obtained in such a way, will contain no TBP nor any trace of the metal elements, if the correct working conditions are used. These metal elements which can be fission products or actinides are, under these conditions, concentrated in the phosphoric solution of TBP. This separation of the TBP and kerosene can be effected in a system comprising two or three phases, the only condition required being that the phase containing finally the TBP is at least 4 M in phosphoric acid ($H_3PO_4$).

The separation of the two or three phases can be made batch-wise. However, one of the features of the invention is a continuous separation: either in a column (pulsed or not), which is fed at the bottom with the solvent to be treated and at the top with phosphoric acid at convenient flow rates, the kerosene freed from its TBP and metal elements, leaving continuously the column by the upper outlets or in a preferred embodiment in a centrifugal extractor, which is simultaneously fed with the solvent and the concentrated phosphoric acid in the convenient proportions, the centrifugation resulting in a clear-cut separation which contributes to an optimal decontamination of the kerosene.

In the same preferred embodiment, the second step of the process according to the invention consists in the decomposition of the TBP in acid medium at a temperature of about 175° C or more, leading to the formation of a very concentrated phosphoric acid (heavy inorganic fraction) and simple organic compounds (essentially hydrocarbons), which are combustible and volatile at the reaction temperature. The composition of the organic fraction (distillate) can be directed by selecting the working conditions, so as to form light hydrocarbons (butenes, volatile at room temperature) or compounds condensable at room temperature (carbon chains of 8 or more carbon atoms). The reaction is preferably carried out under inert atmosphere, e.g. by bubbling nitrogen, which causes at the same time some agitation during the reaction. According to the wanted result, the nitrogen stream can be humidified. In all cases, the organic fractions carry less than 0.005% of the total activity, which means a decontamination factor (D.F.) for the organic substrate of more than $10^4$.

According to an additional feature of the process according to the invention, the decomposition of the TBP is performed by keeping the TBP-acid phase in a thin film, so as to cause a quick removal of the formed gases in order to prevent their polymerization. Although various devices can be used for that purpose, namely a column with a coil or a series of grooved inclined plane boxes, the pyrolysis reactor is preferably a wiped film pyrolysor, in which the liquid phase flows down by gravity, whereas the gases flow in countercurrent.

According to an important feature of the process, the energy needed for the conversion of the ester is obtained by the combustion of the hydrocarbons produced by this dealkylation and/or the organic diluent originating from the first step of the process (separation of the ester and its diluent). Moreover, catalysts can be added to the reaction medium, in order to speed up the ester conversion or in order to prevent the formation of polymers or also to favour the conversion of the organic compounds of the solvent into simple (saturated or not) hydrocarbons, which are volatile at the reaction temperature. These catalysts are preferably selected among steam, and metals of the platinum series.

In the same preferred embodiment, the third step of the process comprises the solidification of the liquid radioactive waste, which takes place by the reaction of the concentrated phosphoric acids of this waste, on aluminium oxide at a temperature higher than 150° C, preferably between 150° and 600° C, in such a way that either a granular solid (e.g. in a fluidized bed reactor) or a monolithic product is obtained. The granular product formed can be incorporated into bitumen, into synthetic resins (e.g. resins of the epoxy- or phenoxy-type), glass or a metal matrix.

The aluminium oxide, which is used for the solidification of the liquid radioactive waste, may have previously been used as a filter agent for the kerosene in the first step of the process.

The process is very suitable for the treatment of spent solvents deriving from processes used for the recovery of radioactive elements, in particular uranium and plutonium from irradiated fuel elements.

Compared with previously known processes, the process according to this invention has the following advantages:

it requires no pretreatment resulting in a transfer or dilution of radioactivity;
it can be realized with a reagent (phosphoric acid) produced by the process itself;
it is non-polluting and no effluent is discharged, nor in the earth nor in the atmosphere, during the treatment of the solvent;
it is an economic process in the sense that during the reactions involved in it enough fuel is produced for supplying the energy needed for the process;
it allows a concentration of the radionuclides, present in the original solvent waste by a factor of 20 to 100;
the inorganic concentrate obtained by this process can eventually be added to the aqueous medium-level or high-level liquid radioactive waste, in which it can play a favourable role for the insolubilization of the radionuclides during the solidification of the wastes, whatever be the selected solidification process.

EXAMPLES

A few illustrative and non-limitative embodiments of the process according to the invention are described in the following examples.

EXAMPLE 1

One liter of a spent 30 vol.% TBP solution in kerosene containing, besides the solvent degradation products, fission products with a total $\beta$-$\gamma$ activity of 10 mCi and $\alpha$-emitters with a total of 1 mg plutonium and 0.1 g uranium is used.

1 liter of this solution is contacted in a separatory funnel with 250 ml of 14.7 M phosphoric acid ($H_3PO_4$) during two minutes.

After settling of the liquids, three phases are separated, i.e.

a light organic phase having a volume of 672 ml and a density of 0.76 (the same as that of the used kerosene), which contains no acid nor water and less than 0.01 mCi $\beta$-$\gamma$ activity and in which Pu and U are not detectable (the analysis shows that the solution still contains about 1% TBP);

a heavy organic phase (intermediate phase) having a volume of 400 ml and a density of 1.14, containing 4.1 M $H_3PO_4$ and 9.2 mCi $\beta$-$\gamma$ activity, 0.1 mg of Pu and 10 mg of U (the analysis shows that this phase contains about 5% kerosene);

a heavy aqueous phase having a volume of 151 ml and containing 13.2 M $H_3PO_4$, about 0.8 mCi $\beta$-$\gamma$ activity, 0.9 mg of Pu and 0.09 g of U.

A second contact of the light organic phase with 14.7 M $H_3PO_4$ in the same volume ratio of 5 gives a colourless and inactive solution of 665 ml of kerosene.

Likewise three consecutive contacts of the intermediate phase (TBP-$H_3PO_4$ mixture) with 14.7 M $H_3PO_4$ result in the elimination of kerosene from the intermediate phase without any less of $\beta$-$\gamma$ activity therein.

EXAMPLE 2

1 liter of a TBP phosphoric solution, free from kerosene, obtained as in example 1 (intermediate phase) having an acidity of 5.1 M $H_3PO_4$ and containing in total 23 mCi $\beta$-$\gamma$ activity, 0.25 mg of Pu and 25 mg of U, is introduced in a jacketed cylindrical glass vessel.

This dealkylation (ester conversion) reactor is heated by means of silicone-oil circulating through the jacket and an electrical heated thermostat and equipped with a gas outlet. The condensable gases are condensed in a water-cooled condenser and the in the normal conditions non condensable gases are trapped at a temperature of $-86°$ C by means of a mixture of acetone and solid $CO_2$. The sweeping of the formed gases, is effected by means of a nitrogen stream which causes also a good mixing of the reaction solutions.

As the temperature is brought to 180° C, a mixture of hydrocarbons, butyl alcohol and water as well as small quantities of butenes first distills. After half an hour the solution becomes brown and starts to foam and to emit white vapors, whereas the $CO_2$-trap becomes filled with butenes. After three hours, the complete ester conversion is achieved. In the reaction vessel remain 380 ml of an amber-coloured liquid having a density of 1.98 and an acidity of 18.8 M $H_3PO_4$ and 0.6 M $H_4P_2O_7$ (pyrophosphoric acid), all the involved phosphorus being present in this fraction. This fraction contains also all the fission products and α-emittors. The analysis gives the following results: 61 mCi of β-γ /l; 0.66 mg of Pu/l and 60 mg of U/l.

The first distillate (condensable at room temperature) consists of 173 ml of an organic solution containing nearly only hydrocarbons with 8 or more carbon atoms, and of about 30 ml of water. The β-γ activity of this distillate is at the detection limit.

The second distillate (condensed at −86° C) has a volume of 420 ml and consists of a liquid which is volatile between −7° and +4° C and is a mixture of butene isomeres. No β-γ or α activity could be detected in this distillate.

EXAMPLE 3

1 liter of the spent TBP/kerosene solution, already used in example 1, is contacted with 110 ml of an inactive phosphoric acid concentrate, obtained as in example 2, except that it is obtained from inactive solutions, and having an acidity of 18.7 M $H_3PO_4$ and 0.7 M $H_4P_2O_7$.

After settling, two phases (instead of three in example 1) are separated; i.e a light organic phase having a volume of 685 ml and a density of 0.76 and containing no acid nor water and less than 0.001 mCi of β-γ activity, Pu and U being not detectable, this phase containing less than 0.5 % of TBP;

a heavy phase having a volume of 420 ml, a density of 1.19, an acidity of 4.9 M $H_3PO_4$ and 0.18 M $H_4P_2O_7$ and containing 10 mCi β-γ of activity, 1 mg of Pu and 0.1 g of U (the analysis shows that this phase contains less than 1 % of kerosene).

This second phase containing in this way all the initial activity is treated as in example 2.

After 3 hours reaction time, a brown amber-coloured liquid having a volume of 162 ml of recovered, its density being 1.99, its acidity 18.5 M $H_3PO_4$ and 0.84 M $H_4P_2O_7$, this liquid containing all the fission products and α-emitters. The analysis shows : 62 mCi of β-γ activity/l, 6.2 mg of Pu/l and 0.62 g of U/l. As in the example 2, the β-γ activity of the condensable distillate is at the detection limit, whereas the volatile distillate is completely inactive.

EXAMPLE 4

The same process as in example 3 is used, except that the heating of the silicone oil used for the thermostatization of the ester conversion reactor at 180° C is achieved by burning the gases formed during the preceding test. Although the energetic yield was of less than 10% in this laboratory test, the dealkylation was nevertheless achieved after the complete burning of the produced gas quantity corresponding to the total dealkylation of the TBP to be treated.

EXAMPLE 5

An air-pulsed extraction column having a length of 150 cm and a diameter of 5 cm, equipped with perforated plates and shielded on the outside (biological protection) is used.

The column is continuously fed at the bottom with a spent TBP-kerosene solution having the same characteristics as the solution of example 1, at a flow rate of 10 l/h. Counter currently an anhydrous mixture of phosphoric acids ($H_3PO_4$: 18.7 $H_4P_2O_7$: 0.7 M) is fed at the top of the column at a flow rate of 1.5 l/h.

The liquid leaving the column at the top (flow rate 7 l/h) is kerosene, free from TBP and its degradation products; its acidity is lower than $10^{-3}$ M and the decontamination factors for α-β-γ obtained for this fraction can reach $10^4$ or more.

The TBP which has been extracted from the kerosene by the phosphoric acids leaves the column at the bottom at an average flow rate of 4.5 l/h, has an acidity of 6.2 M $H_3PO_4$ and 0.2 M $H_4P_2O_7$ and contains all the α-β-γ activity of the treated solvent.

This effluent is then dealkylated in a semi-continuous way in a reactor having a capacity of 15 liters, producing each 3 hours:

1. about 7.5 l of butene free from any activity (D.F. $>>10^5$), and about 0.9 l of hydrocarbons containing 8 carbon atoms or more, also free from any activity (F.D. $>10^4$);
2. about 6 l of anhydrous phosphoric acids (average composition : $H_3PO_4$: 18.8 M, $H_4P_2O_7$: 0.6 M) containing 100% of the α-β-γ activity initially present in the treated solvent; from this total 4.5 l are recycled in the TBP/kerosene separation column at a flow rate of 1.5 l/h, the remaining fraction of 1.5 l per batch (or about 0.5 l/h) forming the final liquid radioactive waste, which has a measured average β-γ activity of 200 mCi/l, a Pu content of 20 mg/l and a U content of 2 g/l.

In this example, the light phase (kerosene) formed the dispersed phase with a dispersion of about 20%. Taking in consideration the dimensions of the column, the initial activity of the solvent to be treated and the recycling of the phosphoric acids, the total β-γ activity in the column at steady state was of about 150 mCi.

EXAMPLE 6

A commercially available centrifugal extractor with 3 stages (laboratory scale, useful capacity of 1.5 l) is continuously fed at one side with a TBP/kerosene mixture having the same characteristics as the solution of the preceding examples, at a flow rate of 50 l/h and at the other side with active anhydrous phosphoric acids at a flow rate of 7.5 l/h.

The light fraction leaving the extractor (flow rate 35 l/h) is kerosene. No α-activity was detected in this solution and the β-γ activity was at the detection limit.

The heavy fraction leaving the extractor (about 22 l/h) has an average acidity of 6.2 M $H_3PO_4$ and 0.2 M $H_4P_2O_7$ and contains all the α-β-γ activity of the treated solvent.

A wiped film pyrolysor, partly based on the principle of the thin film evaporator, having a capacity of 100 ml is fed at its upper part with the heavy fraction obtained as described hereabove, at a flow rate of 0.5 l/h (the residence time of the liquid phase being in the order of 12 minutes), and at its lower part with a nitrogen stream.

Butene (0.25 l/h) and hydrocarbons containing 8 carbon atoms or more (30 ml/h) are produced and carried away by the nitrogen. The gases contain no activity at all.

Anhydrous phosphoric acids are collected at a flow rate of 0.2 l/h at the lower end of the pyrolysor, thus contain 100% of the α-β-γ activity of the treated solvent, 75% of the production is used to feed the centrifugal extractor, whereas the remaining 25% forms the final radioactive waste, of which the average β-γ activity amounts to 200 mCi/l, the Pu content to 20 mg/l and the U content to 2 g/l.

Taking into account the dimensions of the two used units, i.e. the centrifugal extractor and the pyrolysor, the initial activity of the solvent to be treated and the recycling of the anhydrous phosphoric acids, the total β-γ activity at equilibrium was 53 mCi in the extractor and 10 mCi in the pyrolysor.

What we claim is:

1. A process for treating organic wastes produced when extracting radioactive metals with a solvent consisting essentially of a phosphoric acid ester or a phosphoric acid ester and an organic diluent comprising:
   a. adding concentrated phosphoric acid to the solvent in an amount such that the metallic contaminants and organic degradation products are contained in a phosphoric acid ester phase and the phosphoric acid ester is separated from any organic diluent present and said phase is at least 4M phosphoric acid;
   b. heating the phosphoric acid ester phase at a temperature of about 175° C or higher to decompose said phosphoric acid ester and to convert said phase into a concentrated phosphoric acid phase containing said metallic contaminants and organic compounds consisting essentially of hydrocarbons; and
   c. converting the concentrated phosphoric acid phase into solid inorganic phosphates comprising the inorganic contaminants by reaction on aluminum oxide at a temperature above 150° C.

2. The process of claim 1 wherein said phosphoric acid ester is tributyl phosphate and said organic diluent is a mixture of liquid aliphatic hydrocarbons.

3. The process of claim 1 wherein the phosphoric acid used in step (a) is a fraction of the phosphoric acid phase obtained in step (b).

4. The process of claim 1 wherein step (b) is carried out in an inert atmosphere.

5. The process of claim 1 wherein step (b) is carried out in the presence of a catalyst such that in step (b) the organic groups of the ester are converted to hydrocarbons which are volatile at the used temperature, and such that no polymerization occurs.

6. The process of claim 5 wherein said catalyst is selected from the group consisting of steam, or platinum.

7. The process of claim 1 wherein the solid formed in step (c) is incorporated into a suitable matrix.

8. The process according to claim 7 wherein the incorporation of the granular product is effected at room temperature and the incorporating material used is a synthetic resin.

9. The process according to claim 1, wherein the energy needed for the de-esterification step (b) is obtained by burning the hydrocarbons produced in step (b) or the organic diluent separated in step (a) or both.

10. The process according to claim 1, in which step (a) is performed in a column which is fed at the bottom with the solvent to be treated and at the top with the polar solvent, the organic diluent without ester or metal elements leaving continuously the upper part of the column.

11. The process according to claim 1, in which the separation of the phosphate and its organic diluent is performed in a multistage centrifugal extractor.

12. The process according to claim 1, in which the conversion of the phosphoric acid ester is performed in a pyrolysis reactor, in which the ester solution to be treated is maintained in the form of a thin film.

13. The process according to claim 1, wherein said radioactive metals are uranium and plutonium.

* * * * *